United States Patent [19]

Sacks et al.

[11] Patent Number: 5,009,822
[45] Date of Patent: Apr. 23, 1991

[54] ALUMINA-OR ALUMINA/ZIRCONIA-SILICON CARBIDE WHISKER CERAMIC COMPOSITES AND METHODS OF MANUFACTURE

[75] Inventors: Michael D. Sacks; Hae-Weon Lee, both of Gainesville, Fla.

[73] Assignee: University of Florida, Gainesville, Fla.

[21] Appl. No.: 380,285

[22] Filed: Jul. 17, 1989

[51] Int. Cl.$^5$ ............................................. C04B 33/34
[52] U.S. Cl. ........................................ 264/23; 264/60; 264/65; 501/89; 501/105; 501/88; 428/373
[58] Field of Search ................ 501/88, 89, 95, 90, 501/105, 12; 428/373; 264/65, 23, 60; 35/56, 2, 8, 48, 49

[56] References Cited

U.S. PATENT DOCUMENTS

| | | | |
|---|---|---|---|
| 4,543,345 | 9/1985 | Wei | 501/95 |
| 4,569,920 | 2/1986 | Smith-Johannsen | 501/1 |
| 4,605,594 | 8/1986 | Owens et al. | 428/373 |
| 4,624,808 | 11/1986 | Lange | 501/97 |
| 4,652,413 | 3/1987 | Tiegs | 264/66 |
| 4,657,877 | 4/1987 | Becher et al. | 501/89 |
| 4,769,349 | 9/1988 | Hillig et al. | 501/95 |
| 4,789,277 | 12/1988 | Rhodes et al. | 501/89 |
| 4,834,928 | 5/1989 | Su | 501/12 |

FOREIGN PATENT DOCUMENTS 8605480  9/1986  PCT Int'l Appl. .................. 35/560

OTHER PUBLICATIONS

*Ceramic Processing* Committee of Ceramic Processing National Academy of Sciences, Washington DC (1968) pp. 23–29 (Materials Advisory Board).
"Efficient Use of Whiskers in the Reinforcement of Ceramics" J. Milewski (1986) pp. 36–41.
*Introduction to the Principles of Ceramic Processing* James Reed pp. 141–149 (1988) Wiley Publication.

*Primary Examiner*—Mark L. Bell
*Assistant Examiner*—Paul Marcantoni
*Attorney, Agent, or Firm*—Kerkam, Stowell, Kondracki & Clarke

[57] ABSTRACT

A SiC whisker-reinforced ceramic article produced by subjecting the SiC whiskers to acid- and/or base-washing; subjecting ceramic particles and SiC whiskers to fluid classification; forming a suspension of the powdered ceramic and SiC whiskers; consolidating the suspension to form a green compact; optionally infiltrating the green compact with an aluminum compound which is a precursor to $Al_2O_3$, and pressureless sintering the green compact to produce an SiC whisker-reinforced composite having high relative density at high SiC whisker loading.

17 Claims, 6 Drawing Sheets

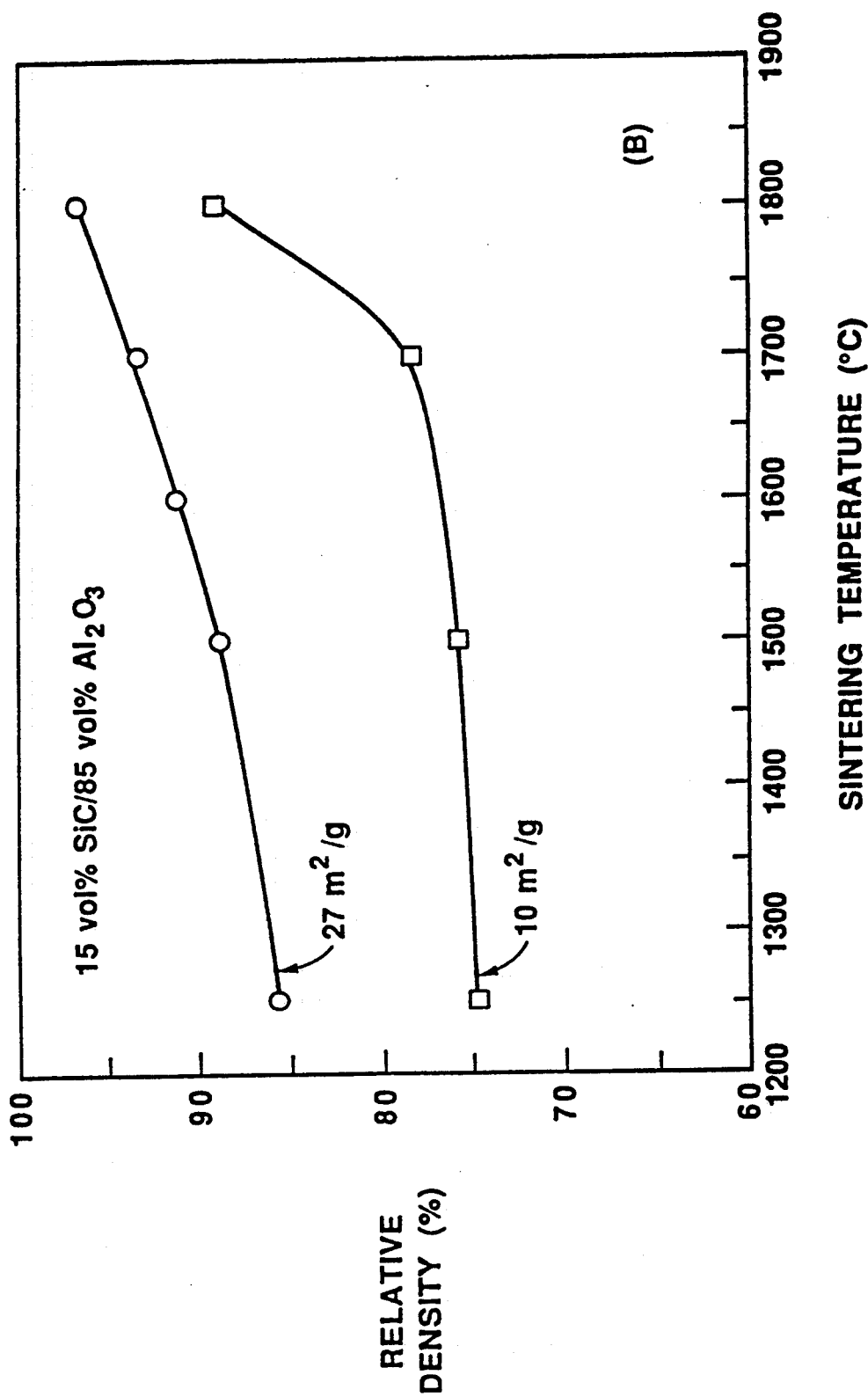

ALUMINA-OR ALUMINA/ZIRCONIA-SILICON CARBIDE WHISKER CERAMIC COMPOSITES AND METHODS OF MANUFACTURE

BACKGROUND OF THE INVENTION

1. Field of the Invention

The present invention relates to silicon carbide whisker reinforced ceramic composites.

2. Description of the Prior Art

Silicon carbide (SiC) whisker reinforced ceramic composites have generated significant interest due to their improved fracture toughness, strength, and other mechanical properties. Commercial applications for these materials have been slow to materialize, however, because of the difficulties associated with developing efficient and economical methods of manufacturing the composites.

One of the primary difficulties facing the industry concerns the inherent inhibition of densification of the composite when whiskers are added to the matrix material. Accordingly, most studies reported in the literature utilize hot-pressing to achieve high densities [Becher et al, J. Am. Ceram. Soc., Vol. 63[12], pp. C-267-C-269 (1984); Wei et al, Am. Ceram. Soc. Bull., Vol. 64[2], pp. 298-304 (1985); Gadkaree et al, Am. Ceram. Soc. Bull., Vol. 65[2], pp. 370-376 (1986); Gac et al, J. Am. Ceram. Soc., Vol. 68[8], pp. C-200-C201 (1985); Chokshi et al, J. Am. Ceram. Soc., Vol. 68[6], pp. C-144-C-145 (1985); Shalek et al, Am. Ceram. Soc. Bull., Vol. 65[2], pp. 351-356 (1986); Samanta et al, Ceram. Eng. Sci. Proc., Vol. 6[7-8], pp. 663-672 (1985); Homeny et al, Am. Ceram. Soc. Bull., Vol. 66[2], pp. 333-338 (1987); Buljan et al, Am. Ceram. Soc. Bull., Vol. 66[2], pp. 347-352 (1987); Porter et al, Am. Ceram. Soc. Bull., Vol. 66[2], pp. 343-347 (1987)].

Hot pressing, however, renders it extremely difficult to achieve control of the shapes and sizes of the ultimate ceramic article. Moreover, hot pressing techniques are notoriously cost-inefficient and time-consuming.

Recently, considerable attention has been paid to pressureless sintering techniques [Tiegs et al Am. Ceram. Soc. Bull., Vol. 66[2], pp. 339-342 (1987); Takao et al, pp. 699-708 in Ceramic Powder Science, Advances in Ceramics, Vol. 21, Eds. Messing et al, American Ceramic Society, Westerville, Ohio (1987); Barclay et al, J. Mat. Sci., Vol. 22, pp. 4403-4406 (1987); Sacks et al, J. Am. Ceramic. Soc., Vol. 71[5], pp. 370-379 (1988); Sacks et al, Ceram. Eng. Sci. Proc., Vol. 9[7-8], pp. 741-754 (1988); Sacks et al, pp. 440-451, Ceramic Powder Science II, A, Ceramic Transactions, Vol. 1, Eds. Messing et al, American Cer. Soc., Westerville, Ohio (1988); Sacks et al, pp. 175-184 in High Temperature/High Performance Composites, Mat. Res. Soc. Symp. Proc., Vol. 120, Eds., F.D. Lemkey et al, Materials Research Society, Pittsburgh, Pa. 1988.] Several approaches have been employed to enhance densification, including (1) using additives which promote liquid-phase sintering, (2) using whiskers with lower aspect ratios in order to reduce the tendency to form shrinkage-inhibiting whisker-network structures and (3) preparing compacts with improved green microstructural characteristics, e.g., higher green density, absence of agglomerates, etc.

U.S. Pat. Nos. 4,652,413; 4,774,209; 4,657,877 and 4,746,635 describe recent attempts to solve the problems inherent in achieving commercially attractive SiC whisker-reinforced ceramic composites; however, all are subject to one or more serious disadvantages. A primary disadvantage resides in the fact that it is virtually impossible, following conventional pressureless sintering techniques, to achieve anything approaching maximum relative densities, especially at high SiC loadings.

It is an object of the present invention to provide novel SiC whisker ceramic composites and improved methods for their manufacture which are not subject to the disadvantages attendant the prior art methods.

SUMMARY OF THE INVENTION

The above and other objects are realized by the present invention, one embodiment of which comprises a method for fabricating a ceramic article comprising SiC whiskers uniformly dispersed in a matrix consisting essentially of $Al_2O_3$ or a homogenous mixture of $Al_2O_3$ and $ZrO_2$, the article containing from about 5 to about 27 vol. % of SiC whiskers and having no less than about 93% of theoretical density, the method comprising:

(a) subjecting the SiC whiskers to an acid- and/or base-washing step for a period of time sufficient to remove leachable impurities therefrom and to improve the dispersibility thereof in water, followed by washing with water (preferably deionized water) to remove the acid and/or base therefrom.

(b) subjecting powdered $Al_2O_3$, or powdered $Al_2O_3$ and powdered $ZrO_2$, and SiC whiskers from step (a) to fluid classification to remove coarse particles and agglomerates, thereby producing powdered $Al_2O_3$, or powdered $Al_2O_3$ and powdered $ZrO_2$, having a specific surface area of at least about 8 m²/g and a particle size distribution in which more than about 98% of the particles have equivalent Stokes diameters of less than about 1.0 µm and producing SiC whiskers having a specific surface area of at least about 3 m²/g and an average aspect ratio of from about 14 to about 21, (c) forming a suspension of the powdered $Al_2O_3$, or powdered $Al_2O_3$ and powdered $ZrO_2$, produced in step (b) and the SiC whiskers produced in step (b) in water at a pH of between about 3.5 and about 4.5 to provide zeta potentials therein of from about 40 mV to about 70 mV and a solution conductivity of from about 0.5 millimhos/cm to about 5 millimhos/cm employing a dispersing agent, the suspension having a solids concentration $\geq$ about 40 vol. %, preferably in the range of from about 40 to about 55 vol. %, (d) consolidating the suspension produced in step (c) to form a green compact comprising a uniform dispersion of SiC whiskers in a homogenous microstructure comprising $Al_2O_3$ or a mixture of $Al_2O_3$ and $ZrO_2$, the green compact having a high relative packing density of from about 66 to about 71% and uniform pores and pore channels having median channel radii $\leq$ about 50 nm, (e) pressureless sintering of the green compact at a temperature in the range of from about 1250° C. to about 1800° C., preferably from about 1700° C. to about 1800° C., in an inert atmosphere for a period of time sufficient to produce the ceramic article.

A further embodiment of the invention comprises the above-described method wherein the green compact produced in step (d) is infiltrated, prior to sintering, with an aluminum compound which is a precursor to $Al_2O_3$ and which forms $\alpha$-$Al_2O_3$ under the sintering conditions of step (e).

Futher embodiments of the invention comprise the novel SiC whisker-reinforced ceramic composites produced by the above-described methods.

DETAILED DESCRIPTION OF THE INVENTION

The present invention enables the obtention of SiC whisker-reinforced ceramic composites having a high degree of density without resort to hot-pressing techniques. As noted above, it has been necessary in the past to resort to hot-pressing techniques in order to achieve sufficient density for high strength applications of the ceramic composites. Hot-pressing, however, is generally limited to relatively simple shapes and it is extremely difficult to obtain ceramic articles having desired shapes, configurations, tolerances, etc. In addition, manufacturing costs tend to be high for hot-pressed parts. Furthermore, hot-pressed materials may have anisotropic physical properties (i.e., due to preferred orientation of whiskers as a result of the applied pressure). Previous attempts to produce SiC whisker-reinforced ceramic composites utilizing pressureless sintering techniques resulted in articles having relatively low densities unless liquid phase sintering additives were used. Liquid-phase sintering additives are well-known to have adverse effects on mechanical properties, such as strength, especially at high temperatures. Furthermore, even with liquid-phase sintering additives, previous attempts to produce SiC whisker-reinforced ceramic composites having both high SiC whisker concentration (>10 vol. %) and high relative density have been unsuccessful. Articles having low relative densities cannot be employed in applications requiring high strength characteristics. Articles having both high whisker concentrations (>10 vol. %) and high relative density are desirable for applications requiring both high strength and high fracture toughness.

The crux of the present invention resides in a series of processing steps which enables the obtention of SiC whisker-reinforced ceramic composites having maximum theoretical densities at high SiC loadings utilizing pressureless sintering techniques.

Each of the processing steps described below are critical to the success of the inventive method. Elimination of any of these steps or alteration of the conditions and/or parameters thereof discussed below results in a significant sacrifice in the density of the ultimate product thereby rendering it non-useful for high strength applications.

The method of the invention is suitable for fabricating ceramic articles comprising SiC whiskers uniformly dispersed in a matrix consisting essentially of $Al_2O_3$, or a homogenous mixture of $Al_2O_3$ and $ZrO_2$, wherein the article contains from about 5 to about 27 vol. % of SiC whiskers having no less than about 93% of theoretical density.

The first critical step in the method of the invention is to provide the starting materials ($Al_2O_3$, or $Al_2O_3$ and $ZrO_2$, and SiC whiskers) with the desired physical and chemical characteristics. In order to achieve homogeneity and efficient dispersal of the SiC whiskers in the ultimate product, it is necessary to subject the whiskers to an acid- and/or base-washing step for a period of time sufficient to remove leachable impurities therefrom and to improve the dispersibility thereof in water, followed by washing with water to remove all residual acid and/or base. A suitable preferred procedure would consist of (i) mixing the SiC whiskers in a solution of deionized water with approximately 0.02–0.05 N nitric acid to give a pH of approximately 2.5 and subsequently rotating the resulting suspension in a plastic container for an aging period of approximately 12 hours., (ii) filtering the aged suspension from step (i) and rinsing with deonized water, (iii) repeating steps (i) and (ii), (iv) redispersing the SiC whiskers in a solution of deionized water with approximately 0.1–0.4 N ammonium hydroxide solution to give a pH of approximately 10.5 and subsequently rotating the resulting suspension in a plastic container for an aging period of approximately 12 hours, (v) filtering the aged suspension from step (iv) and rinsing with deionized water, and (vi) repeating steps (iv) and (v).

The second critical step in the method of the invention is to provide powdered $Al_2O_3$, or powdered $Al_2O_3$ and powdered $ZrO_2$, wherein coarse particles and hard agglomerates of the powdered material are removed and soft agglomerates thereof reduced such that the powdered material has a specific surface area of at least 8 $m^2/g$ and has a particle size distribution in which more than about 98% of the particles have equivalent Stokes diameters that are smaller than about 1.0 $\mu m$. It is also necessary to provide SiC whiskers which are hard-agglomerate-free and have a specific surface area of at least about 3 $m^2/g$ and an average aspect ratio of from about 14 to about 21. It has been determined that providing the starting materials in these forms and at the indicated sizes ensures maximum relative density in the final product.

It has been found that fluid classification techniques yield a powdered matrix material and SiC whisker product substantially free of coarse particles. Classification may be accomplished by dispersing the materials in a fluid and allowing the particles to separate under gravity sedimentation. For greater speed and efficiency, continuous flow centrifugal classification may be utilized. These techniques also remove "hard agglomerates," i.e., those agglomerates of particles which cannot be broken down by ultrasonication.

So-called "soft agglomerates" may be broken down to their component particles utilizing ultrasonication during the fluid classification and at later stages of the method.

In the past, it has been common practice to ball-mill or fine-grind the starting materials to break up hard agglomerates and to obtain smaller particle sizes. These procedures, however, are disadvantageous in that they result in the introduction into the powder of impurities associated with the grinding media. In addition, ball-milling (or other methods of fine grinding) may result in an excessive decrease in the aspect ratio of the SiC whiskers, thereby diminishing the beneficial effect of the whiskers on fracture toughness of the ceramic composite.

Employing a combination of ultrasonication and fluid classification steps, there is provided powdered matrix starting material and SiC whiskers for utilization in the third step of the process.

The third step in the method of the invention is suspension processing of the starting materials prior to consolidation thereof to form a "green" compact. The powdered matrix materials and SiC whiskers are suspended in water at a pH of between about 3.5 and about 4.5 to provide a zeta potential therein of from abut 40 to about 70 mV and a solution conductivity of from about 0.5 to about 5 millimhos/cm, employing a dispersing agent, wherein the suspension has a total solids concentration of from about 40 vol. % to about 55 vol. %.

The provision of a high-solids, highly dispersed suspension of starting materials is critical to the subsequent step of consolidating the aqueous suspension to form a "green" compact having maximum theoretical density. Flocculation of the suspended materials must be avoided in order to maintain homogeneity and maximum density of the final product. In order to maintain the dispersed state, interparticle repulsive forces must be of sufficient magnitude to overcome the tendency of the particles to collide and stick together (e.g., due to van der Waals forces). Electrostatic stabilization can be utilized to prevent flocculation. Particles acquire a surface charge and repel each other upon close approach due to the interaction between electrical double layers. One of the most important factors affecting the magnitude of the repulsive force is the zeta potential (i.e., the near-surface potential). With other factors remaining constant, the repulsive force increases as the absolute value of the zeta potential increases. The zeta potential may be varied by adjusting the pH of the suspension and/or by using dispersing agents.

Another factor affecting the repulsive force between particles is the solution ionic strength, i.e., the concentration and valence of ions in the suspension liquid phase. With other factors remaining constant, the repulsive force between particles decreases as the ionic strength increases. In most processing operations, the zeta potential and the ionic strength are not independently varied. For example, while an acid (or base) may be added to increase the zeta potential, the ionic strength is also increased since the acid (or base) is an elecrolyte which contributes ions to the solution phase. Furthermore, as the ionic strength increases and the electrical double layer is "compressed", the absolute value of the zeta potential tends to decrease. It should also be noted that the amount of acid or base needed to adjust the pH of a suspension increases as the solids concentration increases. Therefore, the effect of ionic strength on suspension stability becomes more important as the solids loading increases.

Both the zeta potential and the ionic strength must be controlled in suspension processing, through appropriate acid or base additions, in order to obtain optimum green micro- structures. To avoid excessive ionic strengths, the solution conductivity is monitored as a function of pH. Optimum dispersion is achieved when the zeta potential is in the approximate range of 40–70 mV and the solution conductivity is in the approximate range of 0.5–5.0 millimhos/cm. These conditions can be achieved with nitric acid additions in the approximate range of 0.02–0.07 moles/liter.

Maximum dispersion of the materials in the suspension is obtained by also employing a polyelectrolyte dispersing agent such as DAXAD ®.

The fourth critical step in the method of the invention is in consolidation of the above-described suspension to form a green compact suitable for pressureless sintering. The potential problem faced in this phase of the operation is that components tend to segregate during consolidation due to differences in settling rate. In casting operations, particles or whiskers with larger size and/or higher density tend to concentrate toward the bottom of the sample whereas particles or whiskers with smaller size and/or lower density tend to segregate near the top of the sample. This results in inhomogeneities, broader pore size distributions and higher overall pore volumes. Porosity effects are due to the less efficient packing of particles, i.e., fine particles are less likely to fill the interstitial space between larger particles when segregation occurs.

A key aspect of the present invention is predicated on the discovery that a green compact cast from a suspension having a high solids loading, i.e., >40 vol. %, has a higher degree of homogeneity and desirable pore size characteristics than those cast from suspensions having lower solids loading values. The green compact is preferably cast in the desired shape, size, configuration, etc., by conventional slip casting, although other casting techniques, such as centrifugal casting (Sacks et al, J. Am. Ceram. Soc., Vol. 71[5], pp. 370–379, 1988) can be used. In one variation of the slip casting technique, the suspension is poured into an open-ended mold (e.g., a plastic or glass tube for casting cylindrical-shaped objects) which is set upon plaster of Paris. The liquid phase from the suspension is drawn into the porous plaster of Paris by capillary suction pressure. After liquid is sucked into the plaster of Paris and the cast body is sufficiently dry, the cast body can be removed from the tube and subsequently oven-dried to remove residual liquid. In centrifugal casting, cylindrical-shaped samples are consolidated from suspensions, poured into tubes with one end closed, which are rotated in a low-speed centrifuge. The compacts forms at the closed end of the tubes and the supernatant liquid (i.e., the liquid from the original suspension) is easily withdrawn from the open end of the tubes. After drying at room temperature, the cast samples are removed from the tubes and subsequently oven-dried to remove residual liquid.

To achieve maximum relative density in the final product, especially in samples with higher SiC whisker contents, it is preferred to infiltrate the green compact with aluminum nitrate nonahydrate, $Al(NO_3)_3 \cdot 9H_2O$, which is a precursor to $Al_2O_3$ and which forms $\alpha$-$Al_2O_3$ under the conditions of the subsequent sintering operation.

The infiltrant fills pores and interstices in the green compacts, thereby increasing the relative density of the green compact, and, after subsequent sintering, resulting in higher relative density of the final article. The aluminum nitrate compound can be infiltrated into the green compact as a melt by heating the compact and the compound at approximately 100° C. After infiltration, compacts are heated to decompose the aluminum nitrate compound. Most of the volatile species can be removed by heating to approximately 600° C. However, it is during the sintering operation that the infiltrated material converts to $\alpha$-$Al_2O_3$. For optimum final density after sintering, multiple infiltrations are desirable before the sintering operation.

The conditions used to achieve high final densities depend heavily on the whisker content. For example, if a sample only contains 5 or 10 vol. % SiC whiskers, then the sample can be sintered to high density more easily, e.g., using lower sintering temperatures, using lower surface area starting materials, without using infiltration, etc. However, as the whisker content increases, higher temperatures, higher surface area powders, and/or infiltration are required to achieve high final densities. It is still possible to sinter samples with 15 vol. % whiskers to 97% density without using the infiltration process (i.e., by controlling powder surface area and sintering temperature). However, without infiltration, the maximum density for samples with 30 vol. % whiskers is 86%. With infiltration, samples with 27 vol. % whiskers can be sintered to 93% density.

The final critical step in the method of the invention is the pressureless sintering operation. Previous attempts to prepare SiC whisker-reinforced ceramic compacts utilizing pressureless sintering techniques resulted in relatively low densities where the product contains more than about 10 vol. % SiC whiskers. Although it is well-known that high SiC whisker contents result in higher fracture toughness values, it is also well-known that densification of such products is severely inhibited by the SiC whiskers. It is a further key feature of the present invention that green compacts prepared according to the above-described method are capable of being pressureless sintered at high volume percent SiC whisker contents to yield products having 93-99% of theoretical density. The pressureless sintering generally must be carried out at a temperature in the range of from about 1700° C. to about 1800° C. in an inert atmosphere, such as argon or nitrogen, for a time sufficient to produce a desired ceramic article. In those instances where a relatively low proportion of SiC whiskers is present and the alumina or alumina/zirconia mixture has a high specific surface area, sintering temperatures as low as 1250° C. may be employed. See FIG. 1A. Generally, a sintering time in the range of from about 15 to about 60 minutes is sufficient although those skilled in the art will be aware that the sintering times and temperatures may be varied depending upon the nature of the green compact to be sintered.

It is preferred to conduct pressureless sintering of the green compact in a packing powder such as silicon carbide. Any suitable inert atmosphere which excludes oxygen, such as argon or nitrogen, may be employed in the sintering operation.

EXAMPLE 1

Following the above-described procedure, composite articles comprising SiC whisker-reinforced $Al_2O_3$—$ZrO_2$ matrices having the compositions set forth in Table 1 were prepared. Table 1 sets forth the sintered densities (as well as the green densities) of the various articles.

TABLE 1

| $Al_2O_3$/$ZrO_2$/SiC vol. % | Green density (%) | Sintered density (%) |
|---|---|---|
| 85/10/5 | 68 | 99 |
| 70/25/5 | 66 | 97 |
| 70/20/10 | 67 | 96 |
| 70/15/15 | 67 | 94 |

EXAMPLE 2

Following the above-described procedure, composite articles comprising SiC whisker-reinforced $Al_2O_3$ matrices were prepared. The compositions and properties of the resulting articles are set forth in FIGS. 1-4.

FIG. 1A, 1B and 1C a plot of relative density vs. sintering temperature for samples prepared with alumina powders having different specific surface areas (10 or 27 $m^2$/g) and with varying $Al_2O_3$/SiC whisker ratio: (A) 5 vol. % SiC/95 vol. % $Al_2O_3$, (B) 15 vol. % SiC/85 vol. % $Al_2O_3$, and (C) 30 vol. % SiC/70 vol. % $Al_2O_3$. Sintering time was 30 min.

FIG. 2 is a plot of relative density vs. SiC whisker content for samples prepared with the 10 $m^2$/g $Al_2O_3$ and 2.0 wt % $Y_2O_3$/ 0.5 wt % MgO sintering additives. Results obtained by Tiegs and Becher, supra, using the same sintering additives, are also shown.

Figure 1A:
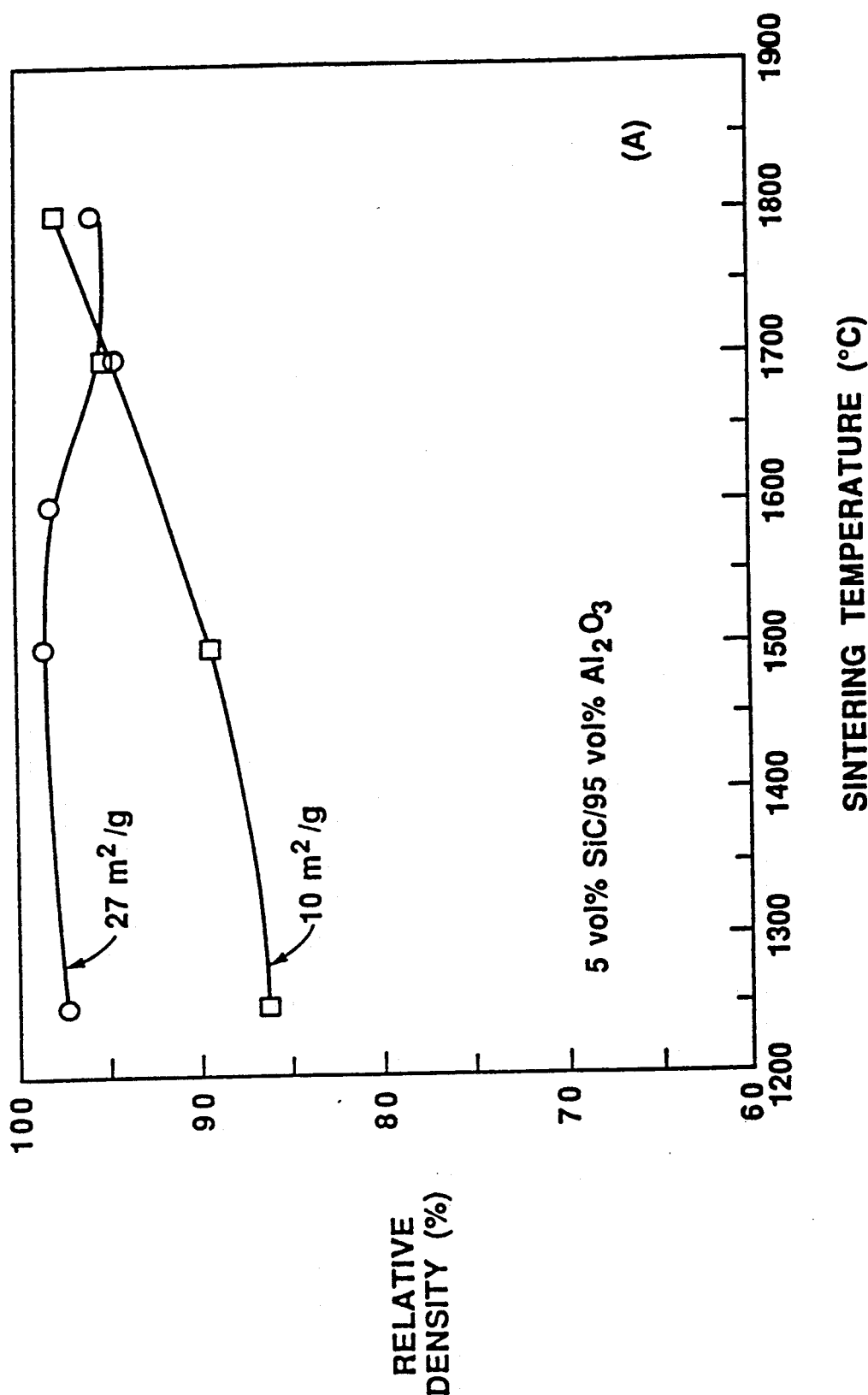
Figure 1C:
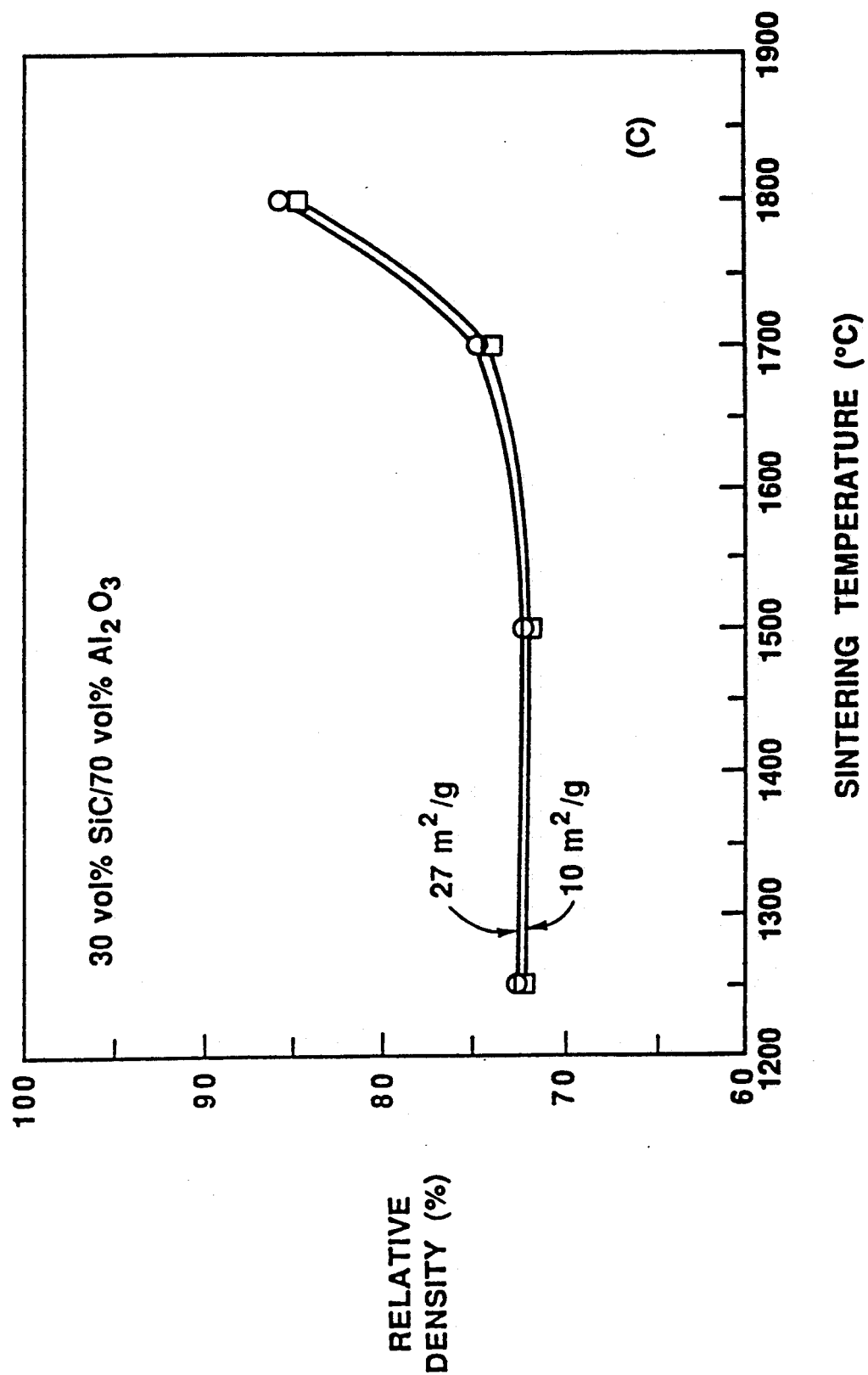
Figure 2:
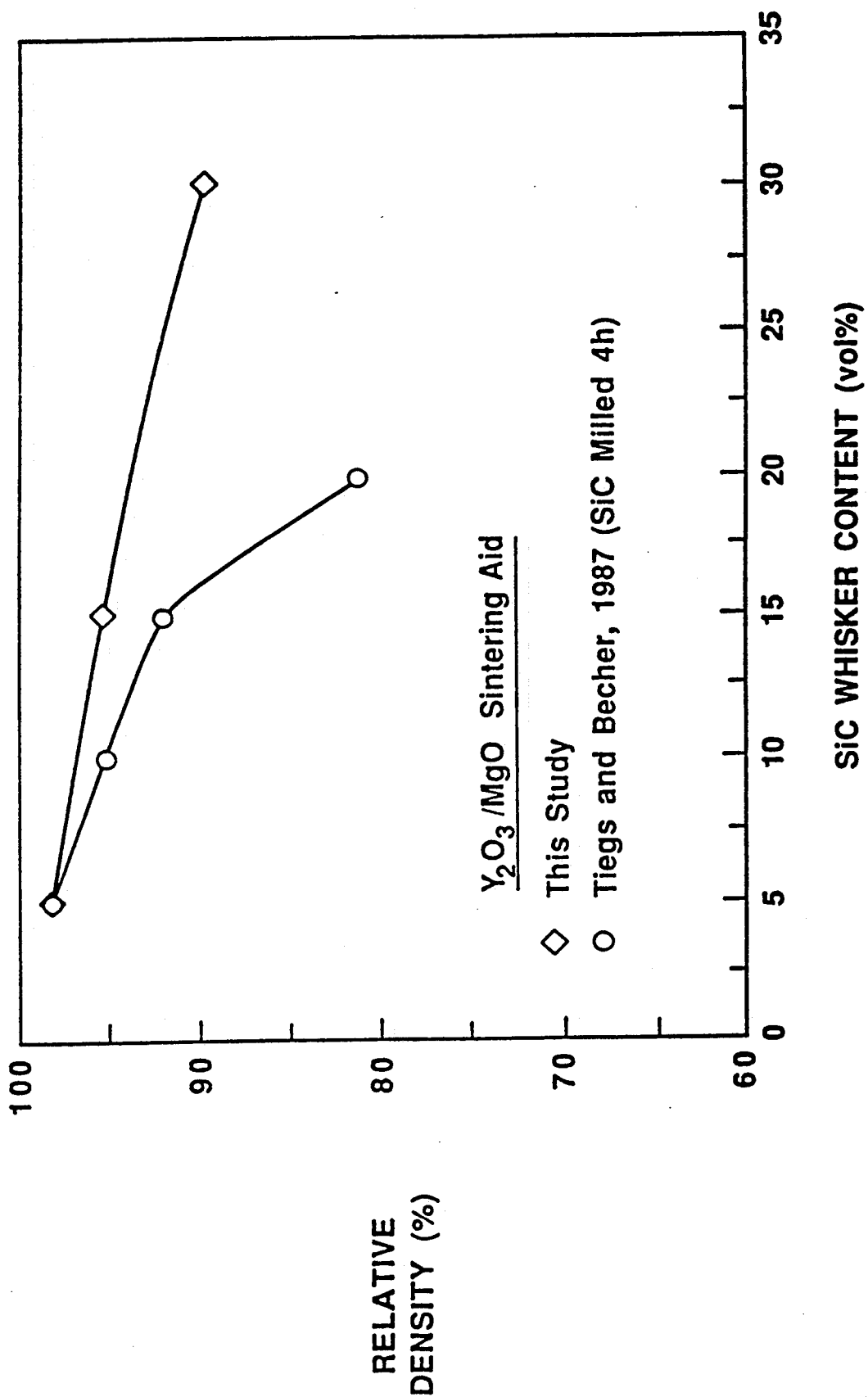
Figure 3:
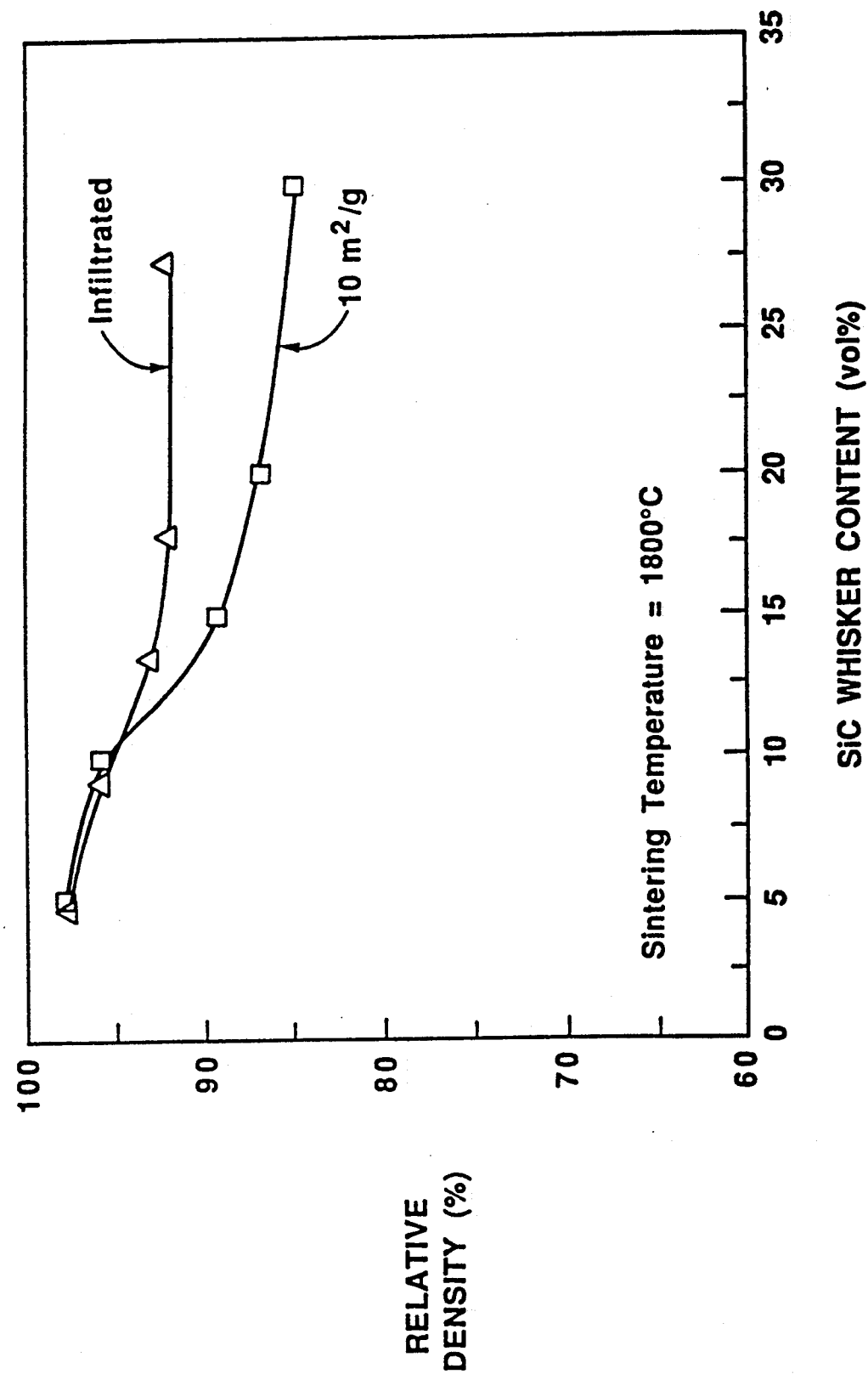
FIG. 3 is a plot of relative density vs. SiC whisker content for 10 $m^2$/g $Al_2O_3$ samples prepared with and without infiltration.
Figure 4:
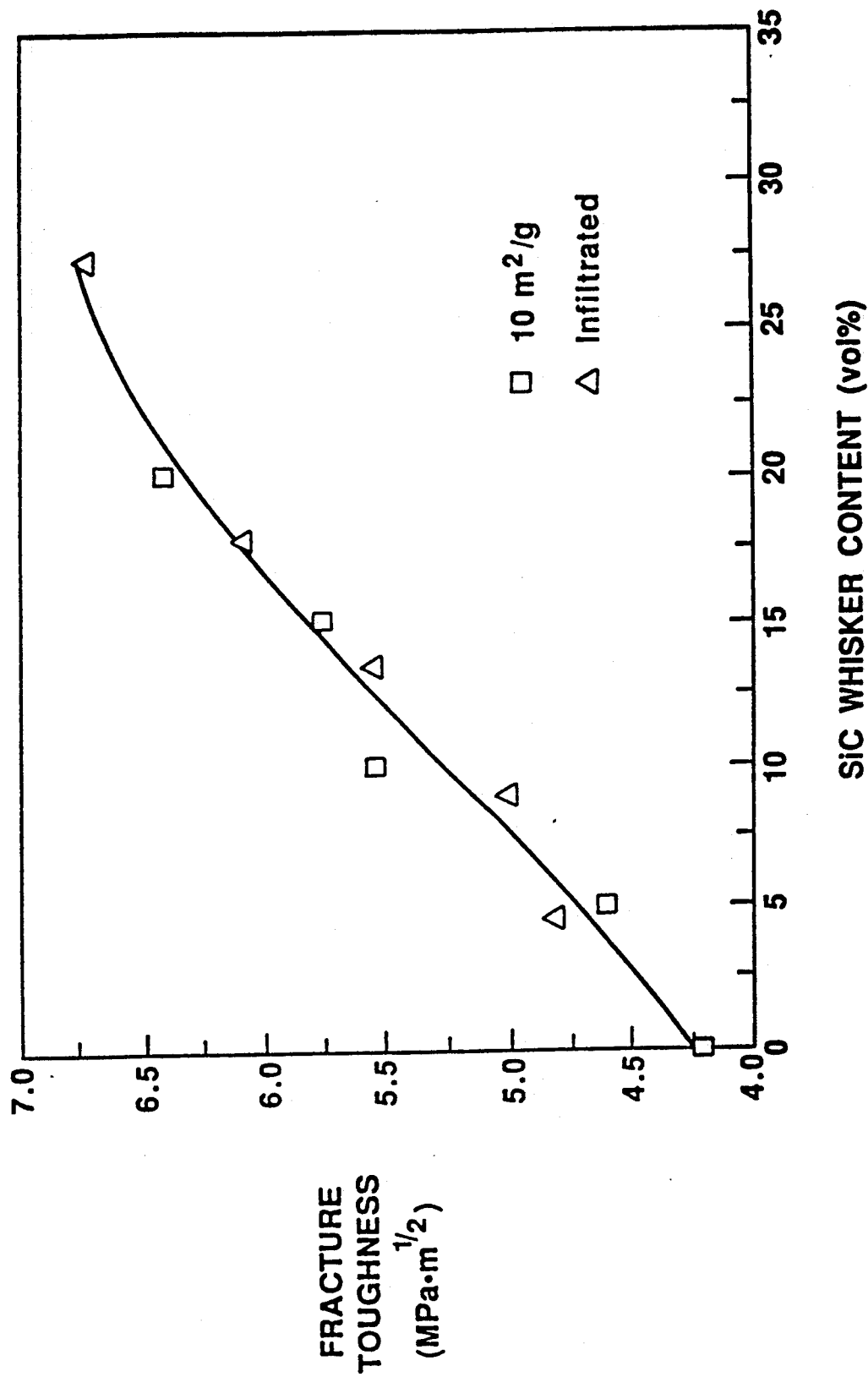
FIG. 4 is a plot of indentation fracture toughness vs SiC whisker content for 10 $m^2$/g $Al_2O_3$ samples prepared with and without infiltration.

We claim:

1. A method for fabricating a ceramic article comprising SiC whiskers uniformly dispersed in a matrix consisting of $Al_2O_3$ or a homogeneous mixture of $Al_2O_3$ and $ZrO_2$, said article containing from about 5 to 27 vol. % of SiC whiskers and having no less than about 93% of theoretical density, said method consisting of the steps:
    (a) subjecting SiC whiskers to an acid- and/or base-washing step for a period of time sufficient to remove leachable impurities therefrom and to improve the dispersibility thereof in water, followed by washing with water to remove said acid and/or base therefrom,
    (b) subjecting powdered $Al_2O_3$, or powdered $Al_2O_3$ and powdered $ZrO_2$, and SiC whiskers to fluid classification to remove coarse particles and agglomerates of said powdered $Al_2O_3$, or powdered $Al_2O_3$ and powdered $ZrO_2$i and SiC whiskers and provide powdered $Al_2O_3$ or powdered $Al_2O_3$ and powdered $ZrO_2$, having a specific surface area of at least about 8 $m^2$/g and having more than about 98% of the particles with equivalent Stokes diameters less than about 1.0 $\mu$m and SiC whiskers having a specific surface area of at least about 3 $m^2$/g and an average aspect ratio of from about 14 to about 21,
    (c) forming a suspension of said powdered $Al_2O_3$, or powdered $Al_2O_3$ and powdered $ZrO_2$, and said SiC whiskers produced in step (b) in water at a pH of between about 3.5 and about 4.5 to provide zeta potentials therein of from about 40-70 mV and a solution conductivity from about 0.5-5 millimhos/cm employing a dispersing agent, said suspension having a solids concentration $\geq$ about 40 vol. %,
    (d) consolidating said suspension produced in step (c) to form a green compact comprising a uniform dispersion of SiC whiskers in a homogenous microstructure comprising $Al_2O_3$ or a mixture of $Al_2O_3$ and $ZrO_2$, said green compact having a high relative packing density of from about 66 to about 71% and uniform pores and channels having median pore channel radii $\leq$ about 50 nm,
    (e) infiltrating said green compact produced in step (d) with an aluminum compound which is a precursor to $Al_2O_3$ and which forms $\alpha$-$Al_2O_3$ under the conditions of sintering in step (f), and
    (f) pressureless sintering said infiltrated green compact at a temperature in the range of from about 1250° to about 1800° C. in an inert atmosphere for a period of time sufficient to produce said ceramic article.

2. The method of claim 1 wherein said matrix of said ceramic article is a homogeneous mixture of $Al_2O_3$ and $ZrO_2$.

3. The method of claim 2 wherein said mixture contains up to about 26 vol. % of $ZrO_2$.

4. The method of claim 1 wherein said powdered $Al_2O_3$, or powdered $Al_2O_3$ and powdered $ZrO_2$, and SiC whiskers are fluid classified by gravity sedimentation or centrifugal sedimentation to remove coarse particles and/or hard agglomerates thereof.

5. The method of claim 1 wherein said powdered $Al_2O_3$, or powdered $Al_2O_3$ and $ZrO_2$ mixture, and SiC whiskers are suspended in a fluid and subjected to ultrasonication to reduce soft agglomerates thereof.

6. The method of claim 1 wherein said SiC whiskers are washed in an aqueous solution having approximately 0.02-0.05 moles/liter nitric acid.

7. The method of claim 1 wherein said SiC whiskers are washed in an aqueous solution having approximately 0.1-0.4 moles/liter ammonium hydroxide.

8. The method of claim 1 wherein said SiC whiskers are both acid- and base-washed.

9. The method of claim 1 wherein said dispersing agent is a polyelectrolyte.

10. The method of claim 1 wherein said suspension produced in step (c) is consolidated by slip casting.

11. The method of claim 1 wherein said suspension produced in step (c) is consolidated by centrifugal casting.

12. The method of claim 1 wherein said aluminum compound is aluminum nitrate nonahydrate, $Al(NO_3)_3.9H_2O$.

13. The method of claim 1 wherein said green compact is infiltrated at approximately 100° C. with a melt of said aluminum compound.

14. The method of claim 1 wherein said green compact is pressureless sintered for 15 to 60 minutes.

15. The method of claim 1 wherein said green compact is subjected to pressureless sintering in a packing powder.

16. The method of claim 15 wherein said packing powder is silicon carbide.

17. The method of claim 1 wherein said green compact is pressureless sintered in an inert atmosphere selected from the group consisting of argon and nitrogen.

* * * * *

UNITED STATES PATENT AND TRADEMARK OFFICE
CERTIFICATE OF CORRECTION

PATENT NO. : 5,009,822
DATED : April 23, 1991
INVENTOR(S) : Michael D. SACKS, ET AL It is certified that error appears in the above-identified patent and that said Letters Patent is hereby corrected as shown below:

In column 8, line 26, claim 1: delete "$ZrO_2 i$" and substitute therefor -- $ZrO_2$, --

Signed and Sealed this

Eighth Day of September, 1992

Attest:

DOUGLAS B. COMER

*Attesting Officer*   *Acting Commissioner of Patents and Trademarks*